F. A. WARREN.
CENTRIFUGAL OILING BEARING FOR CAR AND OTHER WHEELS.
APPLICATION FILED JULY 12, 1910.
986,525.
Patented Mar. 14, 1911.
2 SHEETS—SHEET 1.
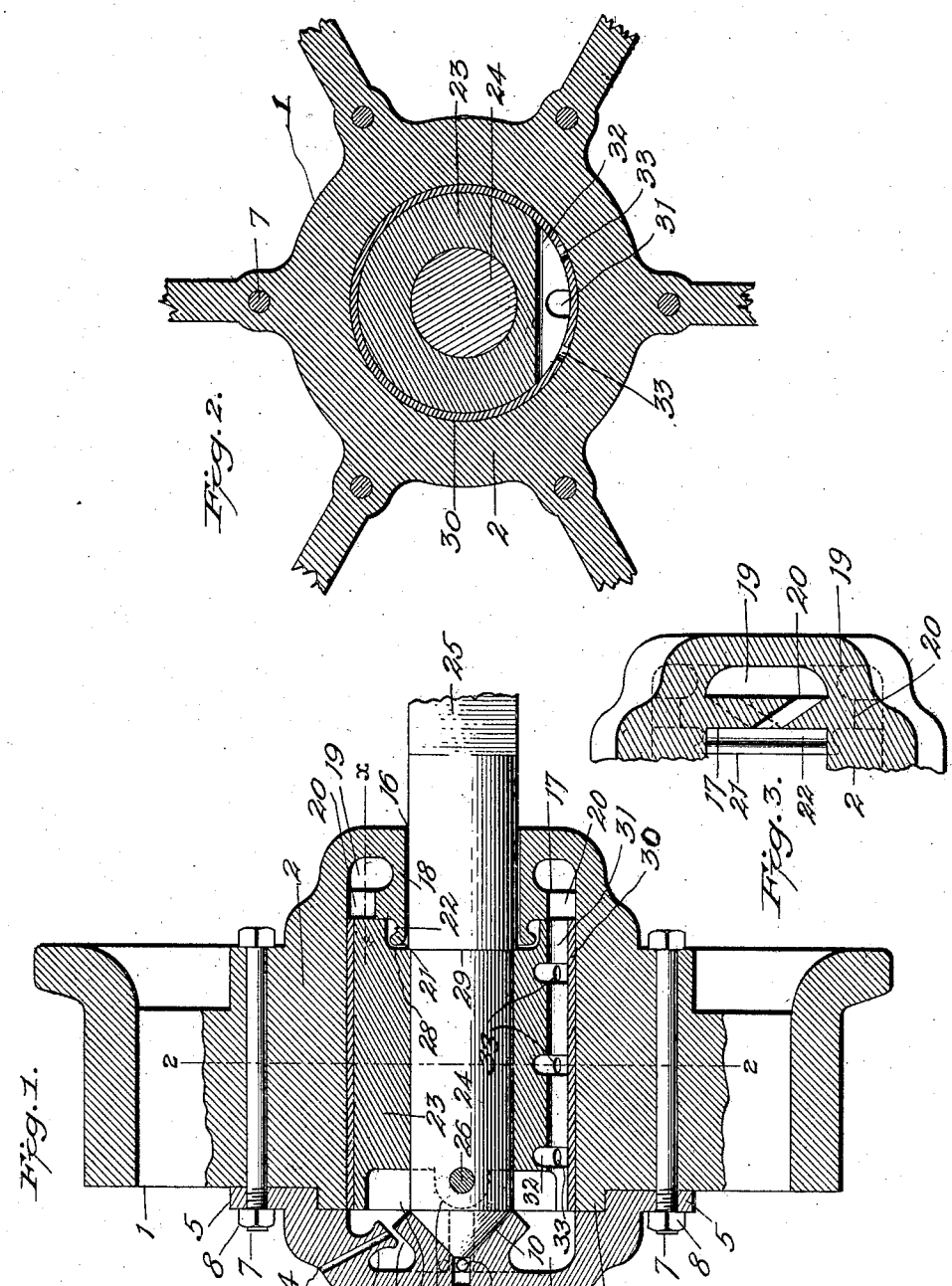
Witnesses:
G. Sargent Elliott
Adella M. Fowle
Inventor:
Frederic A. Warren,
By H. S. Bailey, Attorney.

F. A. WARREN.
CENTRIFUGAL OILING BEARING FOR CAR AND OTHER WHEELS.
APPLICATION FILED JULY 12, 1910.
986,525.
Patented Mar. 14, 1911.
2 SHEETS—SHEET 2.
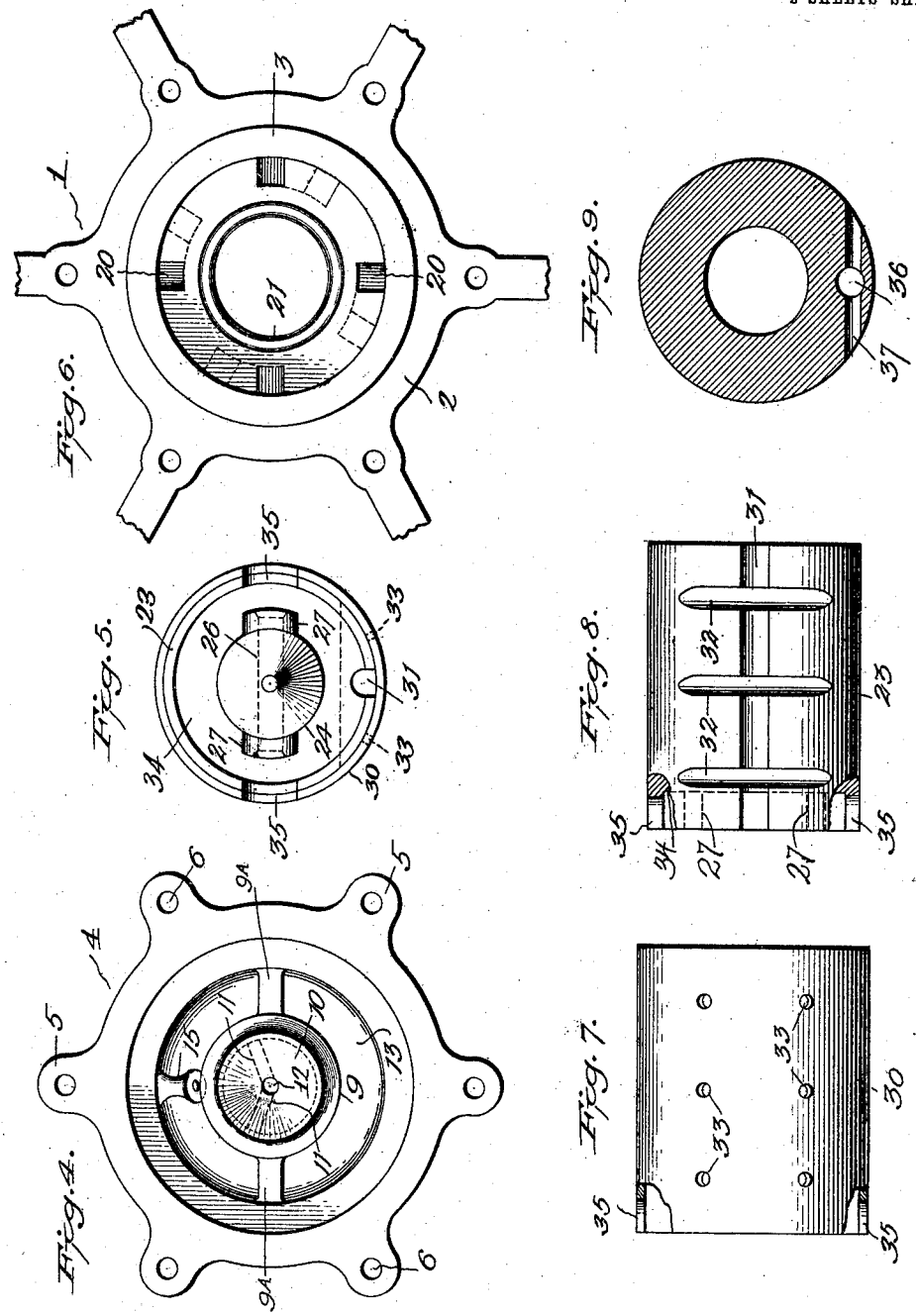

UNITED STATES PATENT OFFICE.

FREDERIC A. WARREN, OF CANON CITY, COLORADO.

CENTRIFUGAL OILING-BEARING FOR CAR AND OTHER WHEELS.

986,525.

Specification of Letters Patent.

Patented Mar. 14, 1911.

Application filed July 12, 1910. Serial No. 571,547.

*To all whom it may concern:*

Be it known that I, FREDERIC A. WARREN, a citizen of the United States of America, residing at Canon City, county of Fremont, and State of Colorado, have invented a new and useful Centrifugal Oiling-Bearing for Car and other Wheels, of which the following is a specification.

This invention relates to centrifugal oiling bearings for car wheels.

The object of the invention is to provide a wheel, the hub of which is formed with an oil pocket at each end, a sleeve being mounted in the hub, which is secured upon the spindle of the axle, the said sleeve being provided with a longitudinal passage which forms a means of communication between the pockets; and with transverse passages which intersect the longitudinal passage whereby the oil is enabled to work around the sleeve and is kept in circulation by the rotation of the wheel, the oil being held within the hub against leakage, thus making it necessary to replenish the supply only at long intervals.

A further object of the invention is to center the axle in the hub cap and thereby prevent lateral twisting of the wheel relatively to the axle and sleeve after the bearings have become worn.

These objects are accomplished in the manner illustrated in the accompanying drawings, in which:

Figure 1 is a vertical, longitudinal, sectional view through a wheel constructed in accordance with my invention. Fig. 2 is a transverse, sectional view thereof on the line 2—2 of Fig. 1. Fig. 3 is a horizontal, sectional view through the inner end of the hub on the line $x$ of Fig. 1. Fig. 4 is an inside view of the hub cap. Fig. 5 is an end view of the axle, with the sleeve thereon. Fig. 6 is a front view of the hub with the cap removed. Fig. 7 is a plan view of the jacket which surrounds the axle sleeve. Fig. 8 is a bottom plan view of the axle sleeve, showing the oil passages therein; and Fig. 9 is a transverse, sectional view through a form of axle sleeve, which dispenses with the jacket.

Referring to the accompanying drawings, the numeral 1 indicates a wheel such as is used in connection with ordinary mining cars, though the invention is applicable to railway cars, and all other classes of vehicles. The hub 2 of the wheel is formed with a bore of greater diameter than the diameter of the axle spindle upon which the wheel is mounted. The outer end of the hub is formed with a circular projection, as shown at 3, and upon this projection is fitted a cap 4, having ears 5, provided with threaded apertures 6, through which are passed the threaded ends of bolts 7, which extend through the wheel spokes and thus hold the cap upon the hub. Nuts 8 are screwed upon the ends of the bolts tightly against the ears of the cap to clamp the bolts firmly to the cap and wheel. A lug 9 projects centrally from the inner face of the cap and is braced at opposite points by ribs 9$^A$. The lug is provided with a conical recess 10, and oil holes or passages 11 extend through the lug at its junction with the face of the cap, which holes are intersected by a hole or passage 12, formed in the lug at the apex of the conical recess 10. An oil pocket 13 surrounds the lug 9 and is of the same diameter as the bore of the hub and an oil inlet 14 extends through the cap and through a lug 15, which projects from the inner face of the cap and terminates in an annular lip or rim, the inlet being on one side of the axial center of the cap, as shown. An axial hole 16 extends through the inner end of the hub and through a wall 17 formed in the hub adjacent to the said end, the wall and end of the hub being connected by an integral neck 18. The space between the wall and the end of the hub forms an oil pocket 19, and oil passages 20 are formed at intervals in the wall 17, which connect the pocket 19 with the bore of the hub. These passages 20 extend through the wall at the line of its union with the hub and at an angle, as clearly shown in Fig. 3, for a purpose to be presently explained. An annular band 21 projects from the wall 17 and is formed with a circumferential groove 22, which is designed to prevent oil from working out through the axial hole 16, as will hereinafter be shown.

A sleeve 23 fits within the bore of the hub, the bore of which sleeve is of slightly less diameter than the axial hole 16, and through the said bore is passed the spindle 24 of an axle 25, and the sleeve is rigidly secured upon the spindle by a pin 26, which extends through the spindle and through apertured ears 27, which project from the outer end of the sleeve. The spindle extends beyond the end of the sleeve and terminates in a conical portion which is adapted to bear in the conical recess 10 of the lug 9 of the hub cap. A counter bored recess 28 is formed in the inner end of the sleeve which is adapted to receive the annular band 21 upon the wall 17, and at the junction of the spindle and axle a shoulder 29 is formed which bears against the face of the recess 28. The inner end of the sleeve bears against the wall 17 and receives the end thrust in one direction while the conical end of the spindle receives the end thrust in the opposite direction. The sleeve is incased in a soft metal jacket 30 of even length with the sleeve and which may be replaced when worn. A longitudinal groove or passage 31, of suitable depth, is formed in the periphery of the sleeve, and this groove is intersected at intervals by transverse grooves 32, preferably of slightly greater depth than the longitudinal groove, and the jacket is provided with two rows of holes 33, which register with the transverse grooves 32. The axle sleeve and jacket being stationary, the grooves 31 and 32 and holes 33 are adapted to stand on the under side of the sleeve, so as to permit of the free passage of the oil through the said grooves and holes. By forming the end of the spindle conical and having it bear in the conical recess 10 in the cap lug 9, an end bearing of small area is provided. Moreover, the spindle being centered in the said conical recess, thereby prevents lateral twisting of the wheel, or maintains it in a position at right angles to its axis, after the bearings have become worn, thus keeping the wheel in good running order for a much longer period than would otherwise be possible.

In assembling the parts, the spindle is inserted in the hole 16 and passed through the bore of the hub far enough to position the hole in the end of the spindle, through which the pin 26 is passed, beyond the end of the hub. The sleeve 23 upon which the jacket 30 has been previously placed is then slipped upon the spindle and the pin 26 is passed through the apertured ears 27 and through the hole in the spindle, and its ends are upset so as to prevent it from coming out. In the present instance, the outer end of the sleeve is provided with a counterbored recess 34 and the ears 27 project from the base of the recess, and when the sleeve is thus recessed it is necessary to form in the marginal rim of the said recess and also in the jacket 30 holes 35 in line with the holes in the ears 27, in order to pass the pin 26 through the said ears and through the spindle. But my invention also contemplates the omission of the recess 34 and the forming of the ears 27 on the flat unrecessed end of the sleeve. After the sleeve is secured upon the spindle it is pushed into the hub, until its inner end abuts against the wall 17. The cap 4 is then bolted upon the hub and oil is fed to the pocket 13 through the inlet 14. The oil passes from the pocket 13 into the sleeve passage 31, and thence into the transverse passages 32 to the holes 33 in the jacket, which lead it to the bore of the hub. If any one of the holes 20 in the wall 17 happens to register with the passage 31 at this time as shown in Fig. 1, the oil also passes into the pocket 19 in the inner end of the hub, and thus the hub is supplied with a quantity of oil sufficient to keep the bearing surfaces lubricated for a long period without the necessity of replenishing the supply. As the wheel rotates the oil is carried around and circulates from one end of the hub to the other. The oil in the pocket 13 passes through the holes 11 and 12 to the conical end of the spindle, while that which works out through jacket holes 33 works around between the jacket and the bore of the hub. The oil in the pocket 19 is fed to the inner end of the sleeve through the holes 20, the angular arrangement of the said holes causing the oil in the said pocket to be more effectively discharged from the same, as it is easier for the oil to pass out through inclined openings than through openings running parallel with the axis of the wheel, the inclined walls of the openings having a tendency to expel the oil as the wheel rotates, and the oil between the end of the sleeve and the wall 17 is prevented from working out through the hole 16 by the grooved band 21.

By constructing a hub closed at both ends, as above set forth, a practically dirt-proof bearing is provided and also one from which it is impossible for the oil to work out, while the centering of the axle in the hub cap reduces the friction and maintains the wheel in proper working position relatively to the axle.

In Fig. 9 I have illustrated a form of axle sleeve in which the jacket is dispensed with. This form of sleeve is provided with a longitudinal oil passage 36, which is located adjacent to the periphery of the sleeve but does not cut through the same. This passage is intersected by a plurality of transverse passages 37, which extend through the sleeve and feed the oil in between the sleeve and the bore of the hub.

Having described the invention, what I claim as new and desire to secure by Letters Patent is:

1. In an oiling bearing as specified, the combination of a wheel hub closed at one end, having an annular pocket in said closed end and openings connecting said pocket with the bore of said hub; a sleeve in said hub having a longitudinal oil passage and intersecting transverse oil passages; an axle extending through the closed end of the hub and rigidly secured to the sleeve; a cap on the opposite end of the hub, having an inlet hole and an oil pocket communicating with the longitudinal passage in the sleeve, and a bearing in said cap for the adjacent end of the axle.

2. In an oiling bearing as specified; a wheel hub having a closed end provided with an axial hole; an annular wall adjacent to said closed end and forming therewith an annular pocket, said wall having holes forming a communication between the pocket and the bore of the hub; a cap on the opposite end of the hub having an oil inlet; an axial bearing on the inner face of said cap; an axle extending through the hole in the closed end of the hub and into the axial bearing, and a sleeve secured upon said axle, one end of which abuts against said annular wall, said sleeve being provided with a longitudinal oil passage and with intersecting transverse oil passages.

3. In an oiling bearing as specified; a wheel hub provided with a closed end having an axial hole; an annular pocket in said closed end and openings connecting the annular pocket with the bore of the hub; a cap for the opposite end of the hub having an inlet hole; a lug projecting centrally from the face of the cap having a conical bearing recess and oil passages connecting the conical recess with the interior of the cap; an axle extending through the closed end of the hub, having a conical end adapted to bear in the said conical recess, and a sleeve rigidly mounted on the axle and abutting against the closed end of the hub, said sleeve having a longitudinal oil passage and intersecting transverse passages.

4. In an oiling bearing as specified; a wheel hub having a closed end; an axial hole in the closed end; an annular pocket in said closed end surrounding the axial hole and holes forming a communication between the annular pocket and the bore of the hub; a cap on the opposite end of the hub having an oil inlet; an axle extending through the closed end of the hub and abutting against said cap; a sleeve on said axle and means for securing the sleeve to the axle, said sleeve being provided on its under side with a longitudinal oil passage and with transverse passages which intersect the longitudinal passage.

5. In an oiling bearing as specified; a wheel hub open at one end and having an axial hole in the opposite end of much less diameter than the bore of said hub, said end being provided with an annular pocket surrounding the axial hole and with holes which form a communication between the said pocket and the bore of the hub; a cap for the open end of the hub having an oil inlet and an oil chamber; a central lug on said cap having a conical bearing, and oil passages connecting said bearing and the oil chamber; an axle extending through the axial hole in said hub and having a conical end adapted to rest in the said conical bearing; a sleeve rigidly mounted on the axle having a longitudinal groove in its periphery, which communicates at one end with the cap chamber, and transverse grooves which intersect the longitudinal groove, said sleeve abutting at one end against the pocketed end of the hub, and a jacket surrounding the sleeve having parallel rows of holes which register with the transverse grooves in said sleeve.

6. In an oiling bearing as specified; the combination with a wheel hub open at its outer end having an axial hole in its inner end of less diameter than the bore of the hub, said end having an annular pocket formed therein, and angularly disposed holes connecting the pocket with the bore of the hub; of a cap for the open end of the hub and securing means for said cap; a lug projecting from the cap having a conical bearing recess; an axle extending through the axial hole in said hub having a conical end adapted to rest in the said conical recess; a sleeve on said axle having apertured ears at one end and a pin which extends through said ears and through a hole in said axle, said sleeve having a longitudinal peripheral groove and transverse grooves which intersect the longitudinal groove, and a jacket surrounding the sleeve having parallel rows of holes which register with the transverse grooves in the sleeve, said cap having an oil chamber communicating with the said longitudinal groove and an inlet to said chamber.

7. In an oiling bearing as specified; a wheel hub having an axial hole in one end of less diameter than the bore of the hub; an annular pocket in said end surrounding the hole and angularly disposed openings connecting the pocket with the bore of the hub; a cap on the opposite end of the hub having an oil receiving chamber; an inlet to said chamber and a conical bearing recess connected by oil holes with the chamber; a sleeve in the hub having a longitudinal groove connecting the chamber and pocket; transverse grooves which intersect the longitudinal grooves and an axial recess in its inner end; an annular band projecting from the end of the hub and extending into the said axial recess, said band having a circumferential groove therein, and a jacket on said sleeve having parallel rows of holes which register with the transverse grooves in the sleeve.

8. In an oiling bearing as specified; a wheel hub having a removable cap on one end; a sleeve in said hub having a longitudinal groove communicating with oil chambers in the ends of the hub, and transverse grooves which intersect the longitudinal groove; an axle secured in said sleeve and abutting against the removable cap, and a jacket on the sleeve having holes which register with the transverse grooves in the sleeve.

9. In an oiling bearing as specified, a wheel hub; a cap on one end thereof having ears provided with threaded apertures; bolts extending through the hubs and said threaded apertures, and nuts on the ends of the bolts; a sleeve in the hub having a longitudinal groove and transverse grooves which intersect the longitudinal groove, the ends of the hub and cap being formed with oil chambers in communication with the longitudinal groove; an axle in the sleeve and abutting against the cap; a jacket on the sleeve having holes which register with the transverse grooves in the sleeve, and an inwardly extending lug on the cap on one side of the axial center thereof which extends at an angle to the axis of the hub and is provided with an oil inlet passage.

In testimony whereof I affix my signature in presence of two witnesses.

FREDERIC A. WARREN.

Witnesses:
G. SARGENT ELLIOTT,
ADELLA M. FOWLE.

Copies of this patent may be obtained for five cents each, by addressing the "Commissioner of Patents, Washington, D. C."